US012470239B2

(12) United States Patent
Meesaraganda et al.

(10) Patent No.: US 12,470,239 B2
(45) Date of Patent: Nov. 11, 2025

(54) WIRELESS COMMUNICATION METHODS AND DEVICES FOR NARROWBAND INTERFERENCE MANAGEMENT

(71) Applicant: Morse Micro Pty. Ltd., Surry Hills (AU)

(72) Inventors: Surendra Raju Meesaraganda, Surry Hills (AU); Navod Devinda Suraweera, Surry Hills (AU)

(73) Assignee: Morse Micro Pty. Ltd., Surry Hills (AU)

( * ) Notice: Subject to any disclaimer, the term of this patent is extended or adjusted under 35 U.S.C. 154(b) by 347 days.

(21) Appl. No.: 18/310,316

(22) Filed: May 1, 2023

(65) Prior Publication Data

US 2023/0421187 A1    Dec. 28, 2023

(30) Foreign Application Priority Data

Jun. 27, 2022  (AU) ................................ 2022901788

(51) Int. Cl.
*H04B 1/10* (2006.01)
(52) U.S. Cl.
CPC .................................. *H04B 1/1027* (2013.01)
(58) Field of Classification Search
CPC .......................... H04B 1/1027; H04B 1/71632; H04B 17/345; H04B 2001/6912; H04B 1/1036; H04B 1/719; H04B 15/06; H04B 17/327; H04B 17/3912; H04J 11/0066; H04L 27/2647; H04L 25/03821; H04W 52/0245
See application file for complete search history.

(56) References Cited

U.S. PATENT DOCUMENTS

| | | | | |
|---|---|---|---|---|
| 9,106,300 | B1* | 8/2015 | Meng | H04B 17/345 |
| 11,075,786 | B1* | 7/2021 | Shattil | H04B 7/024 |
| 2006/0188003 | A1* | 8/2006 | Larsson | H04B 1/719 |
| | | | | 375/130 |
| 2009/0088092 | A1* | 4/2009 | Wang | H04L 25/03828 |
| | | | | 455/114.2 |
| 2009/0207925 | A1* | 8/2009 | Liu | H04L 27/2647 |
| | | | | 375/260 |
| 2017/0257126 | A1* | 9/2017 | Pande | H04J 11/0066 |

* cited by examiner

*Primary Examiner* — Fayyaz Alam
(74) *Attorney, Agent, or Firm* — Polsinelli PC

(57) ABSTRACT

Methods and devices for narrowband interference detection and mitigation during reception of wireless signals. Exemplary interference detection methods or devices observe a frequency domain representation of a received wireless signal to measure power related values, identify a maximum power value and an associated sub-carrier, count sub-carriers having power related values below a threshold power value, detect and locate narrowband interference based on the counted number of sub-carriers. Accordingly, exemplary interference mitigation methods or devices modify the wireless signal based on sub-carriers determined to be affected by narrowband interference in a time domain, frequency domain, or both time and frequency domains. An embodiment of the method or device processes the wireless signal to suppress frequencies associated with the narrowband interference locations by one or more notch filters in the time domain, the device then modifies power related values associated with the sub-carrier affected by narrowband interference in the frequency domain.

21 Claims, 10 Drawing Sheets

WIRELESS COMMUNICATION METHODS AND DEVICES FOR NARROWBAND INTERFERENCE MANAGEMENT

The present application claims priority from Australian provisional patent application number 2022901788 filed on 27 Jun. 2022, the contents of which are incorporated herein by cross-reference.

FIELD OF THE INVENTION

The present disclosure generally relates to wireless communications. Specifically, aspects of the present disclosure are related to narrowband interference management in a Wireless Local Area Network (WLAN).

BACKGROUND

A wireless network, for example a Wireless Local Area Network (WLAN) such as a Wi-Fi (based on the Institute of Electrical and Electronics Engineers (IEEE) 802.11 standards) network includes one or more Access Points (APs) that communicate with one or more Stations (STAs). The APs serves the STAs by a shared wireless communication medium over a specific frequency band. For example, the IEEE 802.11ah standard, also referred to as Wi-Fi Halow, uses sub-1 GHz license-exempt frequency bands to provide extended range Wi-Fi networks. 802.11ah also benefits from lower energy consumption, allowing the creation of large groups of stations or sensors that cooperate to share signals, supporting the concept of the Internet of Things (IoT). The license-exempt frequency band below 1 GHz for Wi-Fi Halow, excluding the TV white spaces, varies from country to country. Some examples of the operating frequency band are 863-868.6 MHz in the Europe, 915.9-928.1 MHz in Japan, 915-928 MHz in Australia, 755-787 MHz in China, 917-923.5 MHz in South Korea, 866-869 MHz and 920-925 MHz in Singapore, and 902-928 MHz in the U.S. The frequency band for Wi-Fi Halow is shared with several other wireless technologies such as LoRa, which makes Wi-Fi Halow devices frequently encountering interference on the communication channels.

The operating frequency band for wireless communication devices in any given country can be subdivided into a series of subchannels. Communication between an AP and a STA takes place on one of these subchannels. The STA may experience various types of interference on the selected subchannel resulting degradation on the wireless services. The type of interference may be classified by frequency and bandwidth; for example, out of band interference refers to other signals outside of the operating frequency band, and in band out of channel interference refers to other signals transmitted in the operating frequency band but on a different subchannel. In channel broadband interference is more like a broadband noise covering the entire subchannel, and in channel narrowband interference refers to other signals transmitted within the same subchannel but has a narrower bandwidth. Some examples of the in channel narrowband interference for Wi-Fi Halow devices are LoRa, narrowband signaling radio, or spurs from other radio transmitters such as 477 MHz walkie talkie. A large interfering signal may overdrive amplifier stages in the wireless communication device. Both the interferer and any wanted signal are distorted when overdriven the signal clips. Depending on the power level and position of the narrowband interference in the signal spectrum, in the presence of narrowband interference, the Signal-to-Interference-plus-Noise Ratio (SINR) reduces in sub-carriers around the interference, which degrades the performance in the wireless network.

In Modulation Code Schemes (MCS) where more redundancy codes are used for error correction or employing modulation types that are less susceptible to noise, the performance is less impacted by the narrowband interference, however, in modulation code schemes that have low coding redundancy or employing modulation types that are more susceptible to noise, the performance degradation due to narrowband interference is much severe. In cases when the narrowband interference falls over pilot sub-carriers, inaccurate synchronization between the AP and STA results in poor tracking and significant degradation. It is important to manage and mitigate the effects of the in channel narrowband interference, where the in channel narrowband interference is simplified as narrowband interference in the disclosure. A wireless communication device needs to decide whether the data received is of good enough quality for packets to be considered as received successfully. Conventionally, techniques have been used to centrally manage interference from an AP, however, real time management of interference during the decoding phase of the received signals has been found to be challenging.

SUMMARY

The following summary presents technical features relating to one or more aspects disclosed herein and should not be considered as an extensive overview relating to all contemplated aspects, nor should the following summary be considered to identify key or critical elements relating to all contemplated aspects or to delineate the scope associated with any aspect. Accordingly, the following summary has the sole purpose to present certain concepts relating to one or more aspects relating to the algorithms disclosed herein in a simplified form to precede the detailed description presented below.

Disclosed are systems and methods for performing wireless communication to detect and mitigate narrowband interference. According to at least one illustrative example, a method of narrowband interference detection and mitigation during reception of wireless signals is provided. The method includes receiving a wireless signal in an operating frequency band on a wireless communication medium by a wireless communication device, observing a frequency domain representation of the wireless signal and measuring power related values of the frequency domain representation, identifying a maximum power value of the power related values and a sub-carrier associated with the maximum power value, calculating a threshold power value based on the maximum power value and a scale factor, and counting a number of sub-carriers having power related values below the threshold power value. The method further includes determining whether narrowband interference is present based on the counted number of sub-carriers, and in response to the presence of narrowband interference in the operating frequency band, determining one or more sub-carriers affected by narrowband interference and modifying the wireless signal based on the determined sub-carriers affected by narrowband interference.

In an aspect of the method, observing and measuring the power related values of the frequency domain representation for narrowband interference detection is only performed during an idle period when there is no data present in the operating frequency band on the wireless communication medium. An embodiment of the idle period is a Distributed coordination function Inter-Frame Space (DIFS) period. In another embodiment, observing and measuring the power related values of the frequency domain representation for narrowband interference detection is performed during detection of data packets, for example, a Long Training Field (LFT) of the data packets is used for narrowband interference detection.

The method further includes converting the wireless signal to the frequency domain representation using a Fast Fourier Transform (FFT) according to an embodiment. In this embodiment, the power related values correspond to magnitudes of FFT outputs. In an aspect of the method for narrowband interference detection, the sub-carriers determined to be affected by narrowband interference include the sub-carrier associated with the maximum power value and one or more adjacent sub-carriers. The sub-carriers determined to be affected by narrowband interference are declared as erasures for time domain processing, frequency domain processing, or both time and frequency domain processing in various embodiments. The number of the sub-carriers determined to be affected by narrowband interference is predefined according to some embodiments or adaptively determined according to other embodiments. In one embodiment, the step of determining whether narrowband interference is present includes comparing the counted number of sub-carriers with a threshold count value, and determining narrowband interference is present when the counted number of sub-carriers is larger than the threshold count. In another embodiment, the step of determining whether narrowband interference is present includes determining a percentage of counted number of sub-carriers to a total number of sub-carriers, and determining narrowband interference is present when the percentage is higher than a predefined percentage.

In an aspect of interference mitigation, the step of modifying the wireless signal includes modifying the power related values of the sub-carriers determined to be affected by narrowband interference in a frequency domain. In one embodiment, sub-carrier indices of the sub-carriers determined to be affected by narrowband interference are communicated to a frequency demodulation processor. In some embodiments, the power related values of the sub-carriers determined to be affected by narrowband interference are zeroed, nulled out, or suppressed.

In another aspect of interference mitigation, the step of modifying the wireless signal includes processing the wireless signal to suppress one or more frequencies associated with the sub-carriers determined to be affected by narrowband interference in a time domain. In some embodiments, processing the wireless signal in the time domain includes filtering the wireless signal using one or more notch filters. A zero of each notch filter is set to a frequency corresponding to one or more sub-carriers determined to be affected by narrowband interference. The notch filters are cascaded first order Infinite Impulse Response (IIR) notch filters according to an embodiment.

In another aspect of interference mitigation, the step of modifying the wireless signal includes processing the wireless signal to suppress narrowband interference in a time domain, then processing in a frequency domain to further mitigate narrowband interference.

In an aspect of narrowband interference detection and mitigation method, the method includes receiving a wireless signal in an operating frequency band on a wireless communication medium by a wireless communication device, observing a frequency domain representation of the wireless signal to detect any sub-carrier affected by narrowband interference, generating one or more narrowband interference locations and identifying one or more sub-carrier indices when narrowband interference is present in the operating frequency band. The method further includes processing the wireless signal to suppress one or more frequencies associated with the one or more narrowband interference locations in a time domain, and modifying power related values associated with one or more sub-carrier affected by narrowband interference according to one or more sub-carrier indices in a frequency domain. In one embodiment, the step of observing a frequency domain representation includes measuring power related values of the frequency domain representation, identifying a maximum power value and a sub-carrier associated with the maximum power value, calculating a threshold power value based on the maximum power value and a scale factor, counting a number of sub-carriers having power related values below the threshold power value, and determining presence of narrowband interference based on the counted number of sub-carriers. In some embodiments, the step of observing a frequency domain representation includes only detecting narrowband interference during an idle period when no data packet is present in the operating frequency band.

In an aspect of the present invention, a wireless communication device with narrowband interference detection and mitigation is provided. The wireless communication device includes an interference detection module, a time domain processing module, and a frequency domain processing module. The interference detection module observes a frequency domain representation of a wireless signal received by the wireless communication device to detect any sub-carrier affected by narrowband interference and generates one or more narrowband interference locations and identifies one or more sub-carrier indices when narrowband interference is present in an operating frequency band. The time domain processing module is coupled to the interference detection module to receive narrowband interference locations and process the wireless signal to suppress one or more frequencies associated with the narrowband interference locations in a time domain. The frequency domain processing module is coupled to the interference detection module to receive the sub-carrier indices, and the frequency domain processing module is also coupled to the time domain processing module to receive processed wireless signal. The frequency domain processing module then modifies power related values associated with sub-carriers affected by narrowband interference according to the sub-carrier indices in a frequency domain. In an embodiment, the time domain processing module includes one or more notch filters, and zeros of the notch filters are set according to the one or more narrowband interference locations.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following drawing figures.

DETAILED DESCRIPTION

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that changes may be made in the function and arrangement of elements without departing from the spirit and scope of the application as set forth in the claims.

Figure 1A:
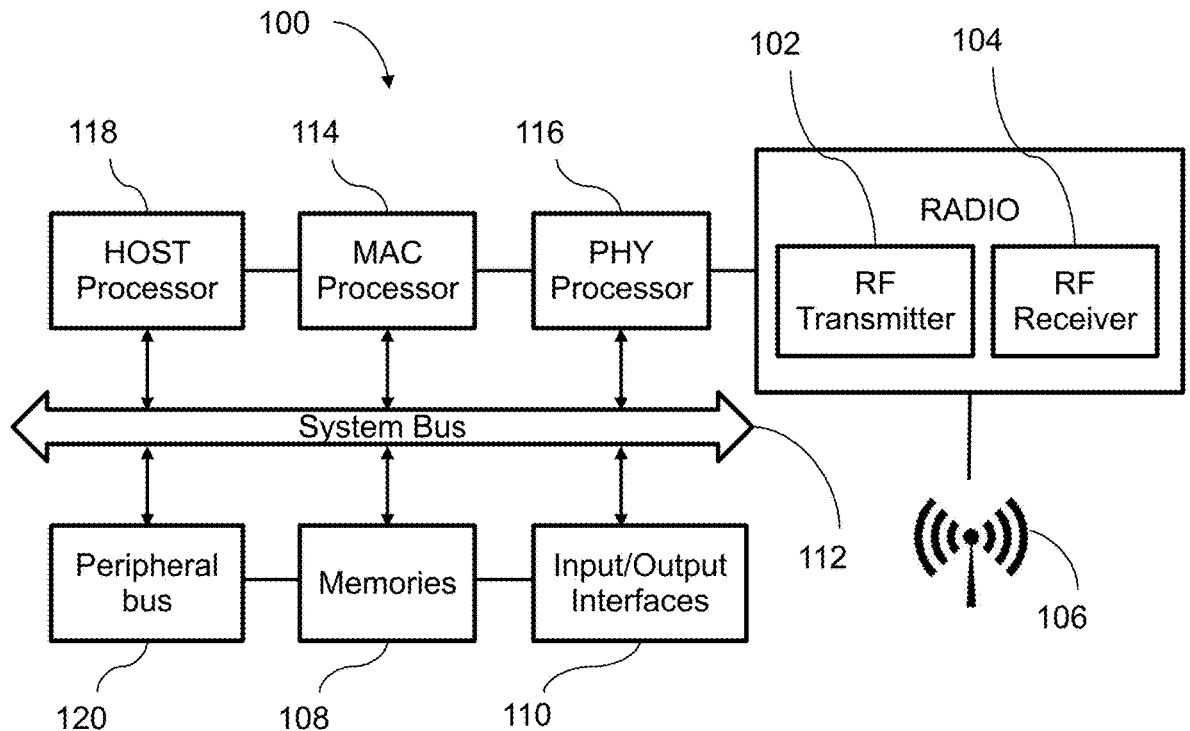
FIG. 1A is a high-level block diagram of a wireless communication device that can implement a station (STA) or access point (AP) operating according to one or more Wi-Fi (IEEE 802.11) standards, in accordance with some embodiments of the present invention.

FIG. 1A is a high-level block diagram of a wireless communication device 100 that can be used to implement a STA or an AP according to some embodiments. The wireless communication device 100 includes a Medium Access Control (MAC) layer and a Physical (PHY) layer complying with one or more IEEE 802.11 standards. In some examples, the wireless communication device includes a mobile device, a wearable device, an extended reality device (e.g., a Virtual Reality (VR) device, an Augmented Reality (AR) device, or a Mixed Reality (MR) device), a personal computer, a laptop computer, a video server, a vehicle (or a communication device on a vehicle), an Internet of Thing (IoT) device, or other device.

The wireless communication device 100 includes a Radio Frequency (RF) transmitter module 102, an RF receiver module 104, an antenna unit 106, one or more memory banks 108, input and output interfaces 110, and communication bus 112. As illustrated, the wireless communication device 100 further includes a MAC processor 114, a PHY processor 116 and a HOST processor 118. These processors can be any type of Integrated Circuit (IC) including a general processing unit, an Application Specific Integrated Circuit (ASIC) or Reduced Instruction Set Computer-five (RISC-V) based ICs, amongst others.

The memory banks 108 store software and/or computer-readable instructions, including software (and/or computer-readable instructions) that can be used to implement at least some functions of the MAC layer. The memory bank 108 can include multiple different types of memory with different performance characteristics. Each processor included in the wireless communication device 100 (e.g., MAC processor 114, PHY processor 116, or HOST processor 118) executes respective software to implement the functions of the respective communication/application layer. Each processor can include a general-purpose processor and a hardware or software services configured to control the processor or a special-purpose processor where software instructions are incorporated into the processor design.

The PHY processor 116 includes a transmitting signal processing unit and a receiving signal processing unit (not shown) and is used to manage the interface with the Wireless Medium (WM). The PHY processor 116 operates on Physical layer Protocol Data Units (PPDUs) by exchanging digital samples with the radio module which includes the RF transmitter 102, the RF receiver 104, Analog-to-Digital Converters (ADCs), and digital filters. The MAC processor 114 executes MAC level instructions and manages the interface between the STA application software and the WM, through the PHY processor 116. The MAC processor 114 is responsible for coordinating access to the WM so that the AP and STAs in range can communicate effectively. The MAC processor 114 adds header and tail bytes to units of data provided by the higher levels in the STA and sends them to the PHY layer for transmission. The reverse happens when receiving data from the PHY layer. If a frame is received in error, the MAC processor 114 manages the retransmission of the frame. The HOST processor 118 interfaces with the MAC layer and is responsible for running higher level functionalities of the wireless communication device 100.

The PHY processor 116, the MAC processor 114, the HOST processor 118, the peripheral bus 120, the memories 108, and the input/output interfaces 110 communicate with each other via the peripheral bus 112. The peripheral bus 220 connects to several peripherals that support core functions of the wireless communication device 100, including timers, interrupts, radio/filters/system registers, counters, Universal Asynchronous Receiver Transmitter (UART), General Purpose Input/Output (GPIO) interfaces, among others. The memory bank 108 may further store an operating system and applications. In some embodiments, the memory stores recorded information about captured frames and packets. The input/output interface unit 110 allows for exchange of information with a user of the wireless communication device 100. The antenna unit 106 includes a single antenna and/or multiple antennas that can be used to implement Multiple Input Multiple Output (MIND) techniques.

Figure 1B:
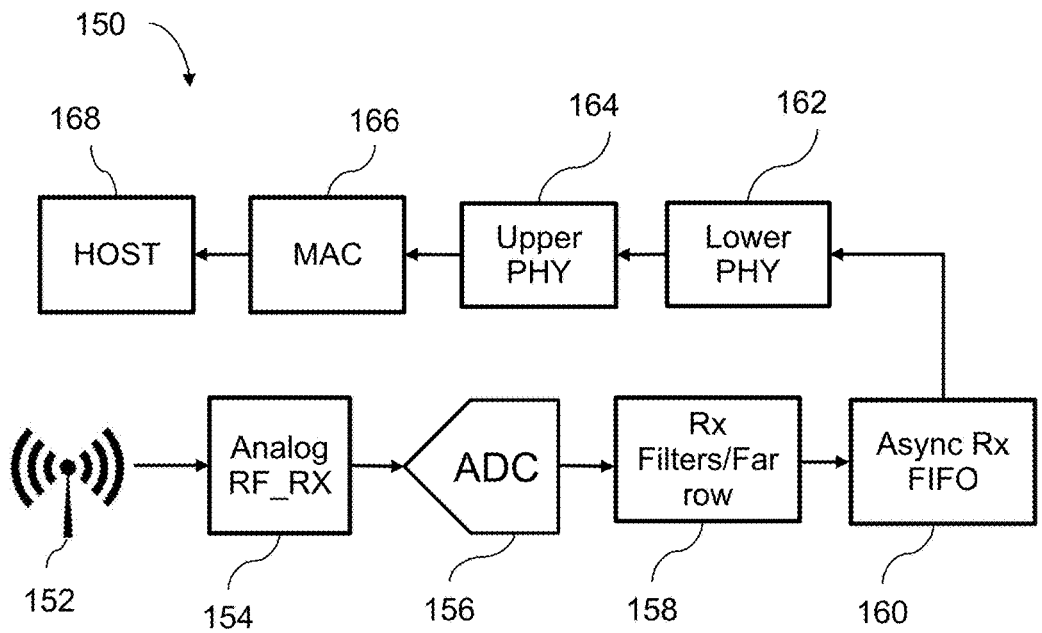
FIG. 1B is a schematic block diagram of the receiver data flow architecture of the wireless communication device of FIG. 1A for receiving Wi-Fi packets over the network, in accordance with some embodiments.

FIG. 1B illustrates a schematic block diagram of a receiver data flow architecture 150 that can be used to receive Wi-Fi packets over the network. In one illustrative embodiment, the receiver data flow architecture 150 illustrated in FIG. 1B corresponds to or otherwise be associated with the wireless communication device 100 illustrated in FIG. 1A. In some embodiments, radio signals are received over the WM and transformed into electrical signals by the receiving antenna 152. The receiving antenna 152 can be the same as or similar to antenna 106 in FIG. 1A. The received signal is conditioned using a series of analog filters 154 (e.g., depicted as analog RF receive (Rx) filters) before being converted into a digital signal equivalent using an Analog-to-Digital Converter (ADC) 156. The sampled signal output of ADC 156 is conditioned again using a digital filter bank 158, which can include one or more digital RF filters and/or a farrow, before the samples are collected in an asynchronous receiving First-In-First-Out (FIFO) data structure 160.

Samples in the asynchronous receiving FIFO structure 160 can be accessed by a plurality of modules. For example, FIFO 160 can be accessed by a packet detect module and a sub-band module, both of which may be included in the lower-level PHY portion 162 depicted in FIG. 1B. In some embodiments, the lower-level PHY portion 162 is itself included in the PHY processor 116 illustrated in FIG. 1A.

The packet detect module included in the lower-level PHY portion 162 can include hardware and/or implement algorithms that can be used to analyze the initial sections of the PHY Protocol Data Unit (PPDU) in the time domain. Based on the analysis, the packet detect module can be used to recognize a received 802.11 frame and synchronize frequency and timing of the STA with the packet being received. The sub-band module included in the lower-level PHY portion 162 includes hardware and/or implement algorithms that can be used to detect which subchannel in the allocated frequency band is being used by the AP for the packet being received.

Once a packet is detected and the relevant subchannel is established, samples can be forwarded to an upper-level PHY portion 164. The upper-level PHY portion 164 together with the lower-level PHY portion 162 can be included in the PHY processor 116 illustrated in FIG. 1A. In some embodiments, the upper-level PHY portion 164 can be used to process and decode Orthogonal Frequency Division Multiplexing (OFDM) symbols, with the support of a coprocessor module, to reconstruct the full PPDU. The reconstructed PPDU is output by the upper-level PHY portion 164 and subsequently processed by the MAC layer processor 166. MAC layer processor 166 can be used to extract the data payload from the PPDU and provide the relevant information to the HOST layer 168 for consumption. In some embodiments, the MAC layer processor 166 illustrated in FIG. 1B can be the same as or similar to the MAC processor 114 illustrated in FIG. 1A. In some cases, the HOST layer 168 illustrated in FIG. 1B can include or otherwise can be the same as or similar to the HOST processor 118 illustrated in FIG. 1A.

The signal spectrum used by Wi-Fi Halow devices may be divided into multiple sub-carriers which are spaced by 31.25 kHz each carrying symbol information. The symbol duration of the 802.11ah standard is approximately ten times that of the 802.11ac standard, making 802.11ah symbols more prone to the interference signal. Narrowband interference, or so called in-band non-WLAN interference, is a major issue in the 802.11ah network since the frequency spectrum is shared by a number of non-WLAN wireless protocols including LoRa, SigFox, alarm and monitoring systems which use Gaussian Minimum Shift Keying (GMSK) modulation. In the presence of narrowband interference, the performance of 802.11ah may be degraded significantly. The performance is characterized as a function of signal power over interference power, also called Signal-to-Interference Ratio (SIR), instead of Signal-to-Noise Ratio (SNR).

Embodiments of the present invention provide methods to manage and reduce the effect of narrowband interference that operates within the physical processing level of the Wi-Fi devices. In some embodiments, the method includes a narrowband interference detection step and a mitigation step. The narrowband interference detection operates in a frequency domain and determines whether the narrowband interference is present by investigating a frequency domain representation of a received wireless signal. For example, the frequency domain representation is a Fast Fourier Transform (FFT) output. The narrowband interference mitigation step can be conducted in a time domain, frequency domain, or both the time and frequency domains. The mitigation step involves altering or modifying, or in some cases nulling out, sub-carriers around the location of narrowband interference. The term narrowband interference location in this patent specification is defined as a representation of a frequency value or a frequency range across the frequency spectrum, for example, the narrowband interference location is indicated by a sub-carrier index.

Embodiments of [KC1] the method manage and reduce narrowband interference using a receiver chain, FFT module, and PHY processor, and the method can be run periodically, for example, the method detects and mitigates narrowband interferences in each packet or idle period. In some embodiments of the present invention, the interference detection step is performed in an idle time between packets to improve accuracy as there are no data packets that overlap with interference during this time period. In some other embodiments, the interference detection step is performed during detection of a data packet, or when the data packet is present on the wireless communication medium, for example, using Long Training Field (LTF) symbols of the packet. However, in this case, the detection accuracy can degrade when the signal power is higher compared to interference, for example, when the SIR is greater than 5 dB. In an embodiment of idle time interference detection, narrowband interference is detected in a Distributed coordination function Inter-Frame Space (DIFS) period. The detection outputs are whether narrowband interference is present and its location in the frequency spectrum. For example, the detection output includes one or more sub-carrier indices corresponding to a sub-carrier overlapped with interference. The interference detection outputs are passed to a co-processor to handle interference during the equalization phase. For examples, the co-processor is a frequency demodulation processor which suppresses energy of a pre-determined number of sub-carriers including the sub-carrier overlapped with narrowband interference.

Figure 2A:
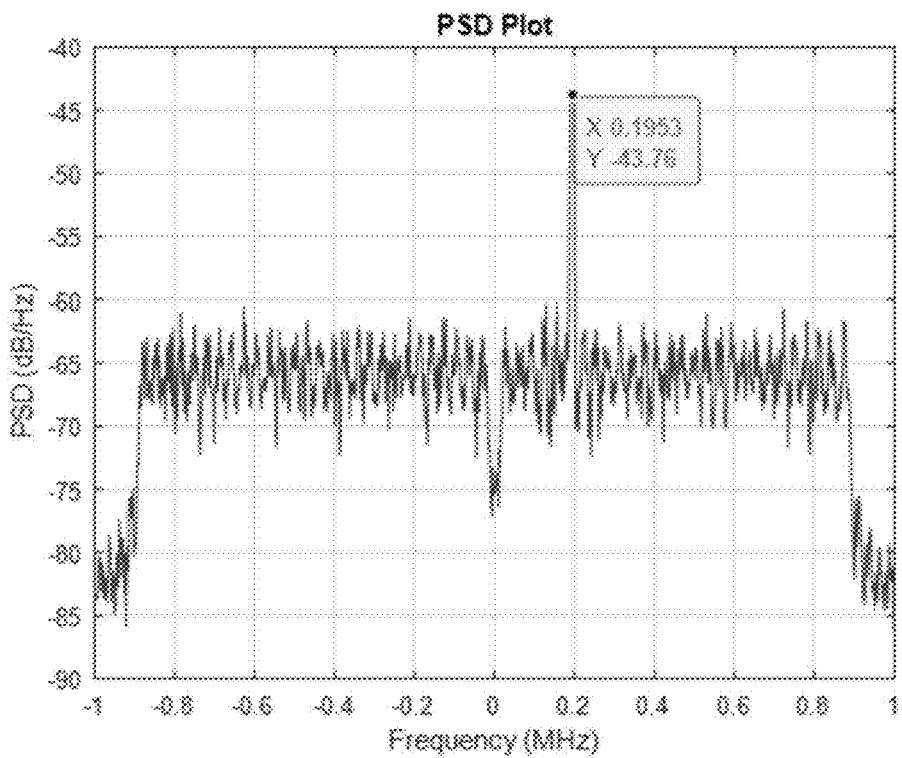
FIG. 2A is a Power Spectral Density (PSD) plot illustrating an example of a narrowband interference observed in an operating frequency band with a 2 MHz bandwidth.
Figure 2B:
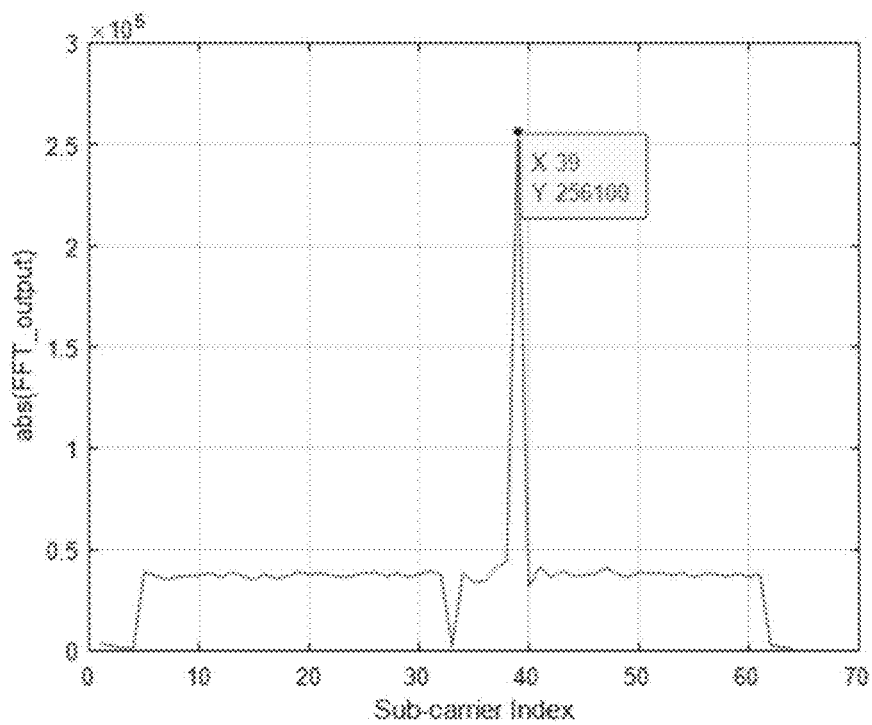
FIG. 2B shows an example of observing narrowband interference affecting a sub-carrier with sub-carrier index equal to 39.

FIG. 2A and FIG. 2B show an example of Power Spectrum Density (PSD) of the signal as received and averaged with narrowband interference present around a sub-carrier with a sub-carrier index equal to 39. The performance degrades as the SIR begins to increase. At an SIR above 8-10 dB, the interference almost gets buried in the signal and it becomes difficult to detect in the presence of a strong packet. At SIR between 10-30 dB, the interference is high enough to cause a degradation in performance. Another issue with narrowband interference detection in the presence of signal is when the channel is highly frequency selective, where a large part of the spectrum is below an average signal level. Under these circumstances, the interference detection algorithm may not be very robust. To address the issue with narrowband interference detection in the presence of a wanted signal or in a frequency selective channel, some embodiments of the interference detection algorithm only conduct detection in idle periods or silence periods so that the interference signature on the channel is clear. To ensure that no station transmits a WLAN signal during the measurement process, embodiments of the interference detection algorithm run interference detection during DISF periods. Ideally, all stations stop transmitting data during the DISF periods. Several Wi-Fi standards have schedule idle time slots, for example, an idle period is allocated after acknowledgement (ACK) packets are received. This scheme of measuring interference in an idle or silence period is invariant to desired signal strength or nature of the channel.

Figure 3:
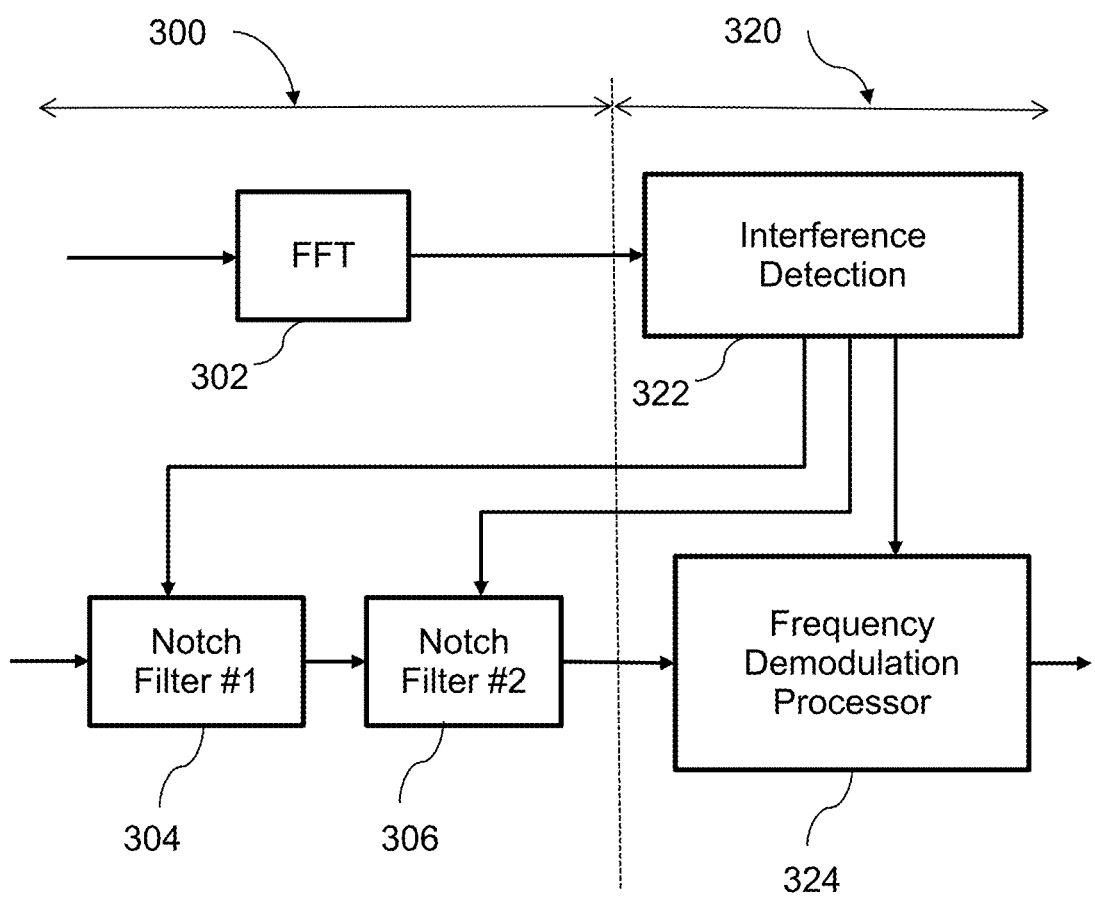
FIG. 3 is a block diagram of a narrowband interference detection and mitigation system according to an embodiment of the present invention.

FIG. 3 [KC2] is a block diagram illustrating a narrowband interference detection and mitigation system implemented in a STA according to an embodiment of the present invention. An example of the STA is the wireless communication device as shown in FIG. 1A. The system can be classified into two parts: a time domain processing part 300 and a frequency domain processing part 320. A FFT 302 receives time domain baseband samples and transforms into a frequency domain representation. In an embodiment of idle time interference detection, the input of the FFT 302 are time domain baseband samples corresponding to the idle period intervals. An interference detection module 322 makes a decision on whether narrowband interference is present in the operating frequency band by observing the frequency domain representation. Embodiments of the interference detection module 332 outputs information related to detected interference location(s). For example, an embodiment of the interference detection module 322 outputs one or more locations of the detected narrowband interference and one or more sub-carrier indices indicating one or more sub-carriers affected by narrowband interference. The wireless communication device sets these sub-carriers to be declared as erasure. The detected narrowband interference is then mitigated by both time domain and frequency domain approaches in this embodiment. In the time domain approach, the wireless communication device uses one or more notch filters to adaptively track and remove narrowband interference. In the embodiment shown in FIG. 3, two notch filters 304 and 306 are cascaded to perform time domain interference mitigation, however, one notch filter, or more than two notch filters can be used to reduce narrowband interference detected by the interference detection module 322. The notch filters 304 and 306 receive time domain samples and mitigate narrowband interference by setting the zero of the notch filter 304 according to an interference location derived from the interference detection module 322 and setting the zero of another notch filter 306 according to another interference location derived from the interference detection module 322. The output of the last notch filter, for example the notch filter 306 in this embodiment, is fed to a frequency demodulation processor 324. In this embodiment, the frequency demodulation processor 324 performs frequency domain interference mitigation according to the sub-carrier indices output from the interference detection module 322. For example, the frequency demodulation processor 324 nulls out or suppresses the sub-carriers declared as erasures. The frequency demodulation processor 324 in this embodiment includes an OFDM demodulator and a decoder. The frequency demodulation processor 324 then decodes the wanted signal to output decoded bits.

In some embodiments of the narrowband interference detection algorithm [KC3], magnitudes of the FFT output are observed during a channel estimation phase. A maximum magnitude of the FFT output (absFFT) and a corresponding sub-carrier index where this maximum FFT magnitude value occurs (max_psd_index) are first identified. The magnitude of the FFT output on each sub-carrier is then compared with a threshold power value. An example of the threshold power value is derived by a Scale Factor (SF) multiplied by the maximum FFT magnitude value. For example, the SF is between 0.5 and 0.8. In an embodiment, narrowband interference is deemed to be detected if a counted number of sub-carriers below this threshold power value is greater than a threshold count value. In another embodiment, narrowband interference is deemed to be detected if a percentage of sub-carriers below this threshold power value is higher than a predefined percentage. For example, the predefined percentage is between 50% to 85%. This information can be used to modify, and in some cases zero, one or more sub-carriers around narrowband interference in the post FFT domain processing. The suppression, or nulling, of sub-carriers, for example, is akin to declaring erasures on the soft-outputs of these sub-carriers and letting the decoder takes appropriate action considering the low confidence on the log-likelihood ratios corresponding to these sub-carriers.

Figure 4:
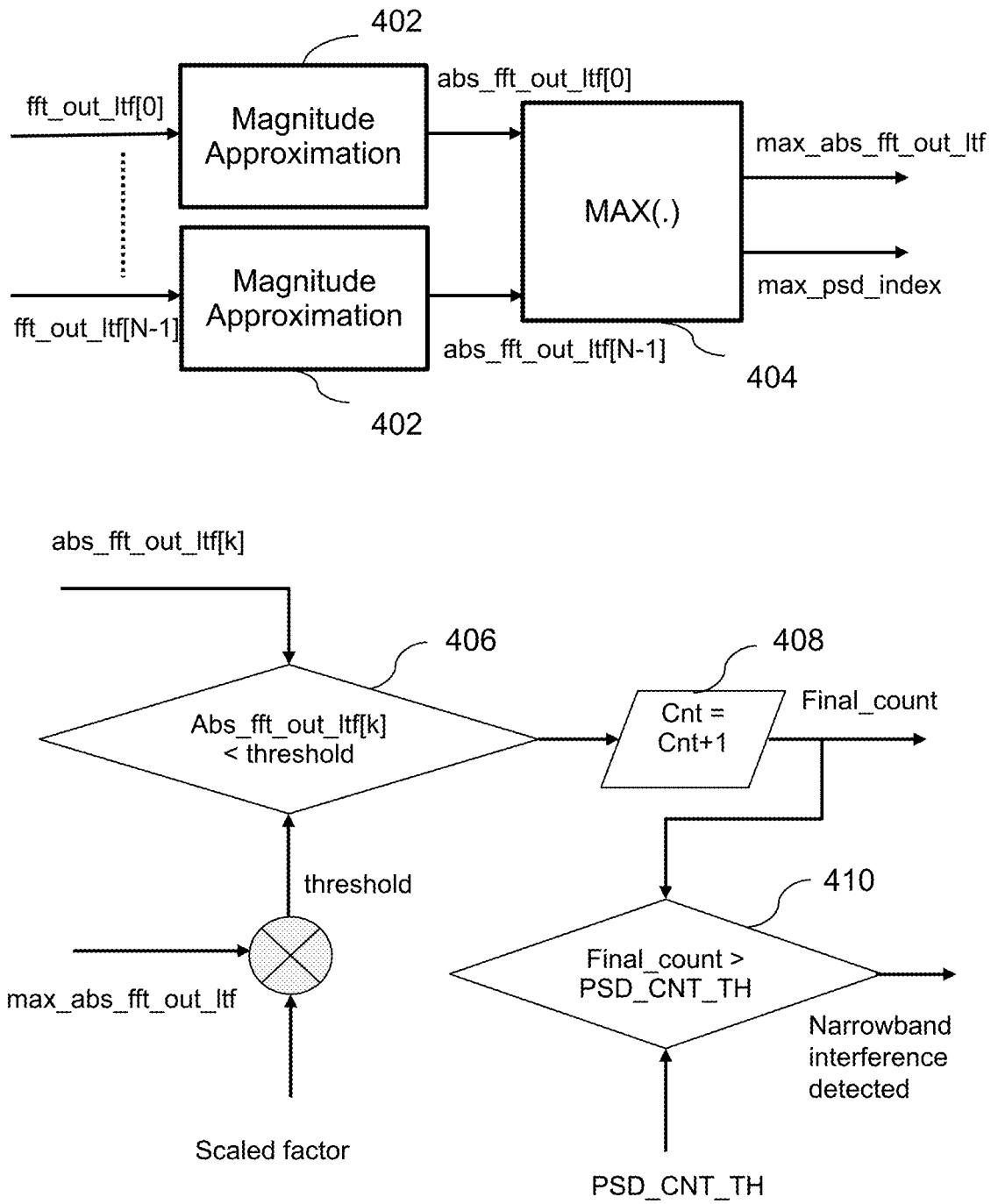
FIG. 4 illustrates flow diagrams of a frequency domain approach to narrowband interference detection according to an embodiment of the present invention.

FIG. 4 is a flowchart illustrating the frequency domain approach of narrowband interference detection according to an embodiment of the present invention. To compute the magnitude of a complex number, the following approximation is used in this embodiment.

$$|a+jb| = |a| + |b| + \frac{||a|-|b||}{2}$$

In FIG. 4, magnitude approximation 402 estimates absolute magnitudes of the FFT output corresponding to each sub-carrier, and a MAX function 404 compares the absolute magnitudes to determine a maximum FFT magnitude value (max_abs_fkout_ltf) and the corresponding sub-carrier index (max_psd_index). In the decision step 406, each absolute magnitude is compared with a threshold derived from a scale factor and the maximum FFT magnitude value. A counter 408 counts a number of sub-carriers with the absolute magnitude below the threshold, and the final count is compared with a Power Spectral Density (PSD) count threshold in the decision step 410 to determine whether narrowband interference is present. Narrowband interference is successfully detected when the final count is larger than the PSD count threshold.

Once the narrowband interference location is determined [KC4], the affected sub-carrier can be modified in the frequency domain to mitigate the effect caused by the detected narrowband interference according to some embodiments of the present invention. The presence of narrowband interference for some sub-carriers is notified to a soft Viterbi decoding module, so the soft Viterbi decoding module takes narrowband interference into account during decoding. In some embodiments, the narrowband interference mitigation algorithm involves nulling out sub-carriers around the location of narrowband interference, which is also referred to creating erasures, in the frequency domain. The number of sub-carriers affected by narrowband interference and modified by the narrowband interference detection and mitigation algorithm (NSub) can be varied. For example, five sub-carriers are modified in the interference mitigation algorithm according to an embodiment, which may not completely mitigate the interference if the impact of interferers having a bandwidth greater than 125 kHz. In this example, the five sub-carriers include the sub-carrier with the highest magnitude value that is overlapped with narrowband interference and four adjacent sub-carriers.

Some simulation results of applying the frequency domain interference detection and mitigation algorithm are shown in the following. A single LoRa in-band interferer with a bandwidth of 125 kHz and a duty cycle of 100% is present on the operating frequency band in these simulations. The interference model is different to LoRaWAN transmission protocol. Furthermore, some Sub-1 GHz interferers have bandwidth higher than 125 kHz. The single interferer setup is only used for initial experimentation and the complexity of the interference setup is increased incrementally to match practical environments. For example, two interferers or several alarm systems operating in the Sub-1 GHz band are added to the experiment setup.

The Packet Error Rate (PER) performance of a Wi-Fi Halow signal (802.11ah signal) impact by LoRa depends on whether the LoRa interferer overlaps with a pilot sub-carrier or a data sub-carrier. The impact of LoRa overlapping on a pilot sub-carrier is more severe than LoRa overlapping only on data sub-carriers. The PER performances of a Wi-Fi Halow signal transmitted on a 2 or 4 MHz channel coded with Modulation Code Scheme (MCS) 0 can be improved in both cases by implementing an embodiment of the interference detection and mitigation algorithm. The performance improvement achieved by the interference detection and mitigation algorithm is higher when LoRa overlaps with a pilot sub-carrier compared to the performance improvement achieved when LoRa overlaps with all-data sub-carriers. For transmitting an 802.11ah signal on a 2 MHz bandwidth with a MCS 0, about 6 dB PER performance improvement can be achieved by the interference detection and mitigation algorithm when LoRa overlaps with a pilot sub-carrier. For transmitting an 802.11ah signal on a 4 MHz bandwidth with MCS 0, the PER performance gain is almost 10 dB when LoRa overlaps with a pilot sub-carrier. However, the PER performance improvement is less than 2 dB when LoRa overlaps with only data sub-carriers.

Figure 5:
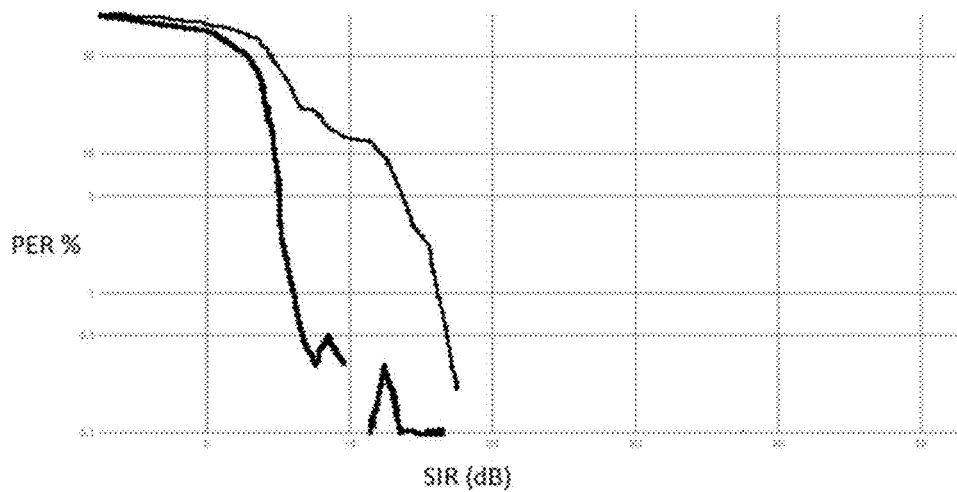
FIG. 5 is a graph illustrating the performance improvement in terms of PER % obtained by an embodiment of the narrowband interference detection and mitigation algorithm in a fixed pilot case for the 4 MHz MCS 0 setting.

FIG. 5 shows a simulation result of the PER performance comparison for implementing an embodiment of the interference detection and mitigation algorithm when fixed pilots are used and LoRa overlaps with a pilot sub-carrier. The performance degradation caused by LoRa interfering with a pilot sub-carrier is higher when fixed pilots are used. The embodiment of the frequency domain interference detection and mitigation algorithm nulls out 6 sub-carriers interfered by LoRa. FIG. 5 illustrates the PER performance improvements achieved by the embodiment of the frequency domain interference detection and mitigation algorithm in the case of transmitting an 802.11ah signal on a 4 MHz MCS 0 setting, where the thick line represents the result of a system implementing the embodiment of the interference detection and mitigation algorithm and the thin line represents a result of a conventional system without implementing the interference detection and mitigation algorithm. As shown in FIG. 5, close to 7 dB of PER performance improvement is achieved with fixed pilots for the 4 MHz MCS 0 setting.

Figure 6:
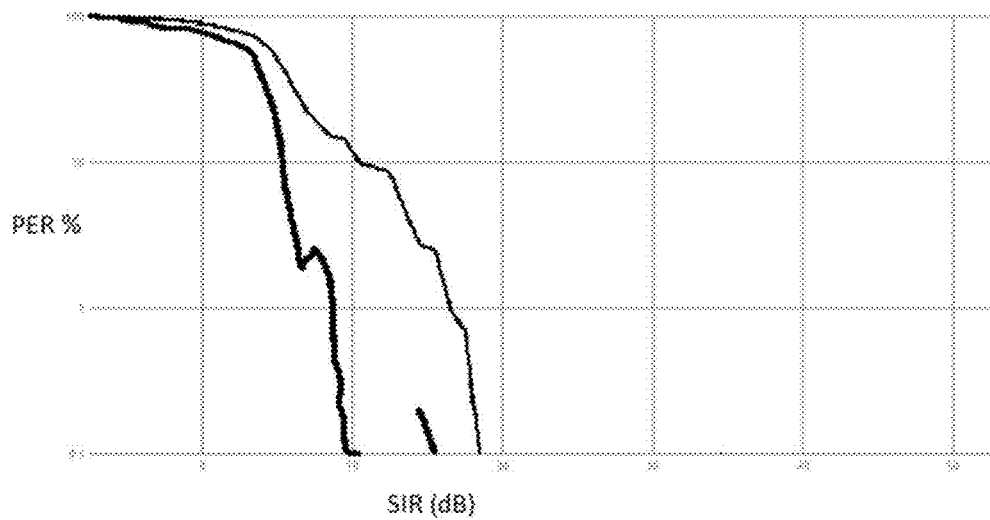
FIG. 6 is a graph illustrating the performance improvement in terms of PER % obtained by an embodiment of the narrowband interference detection and mitigation algorithm in a travelling pilot case for the 4 MHz MCS 0 setting.

By default, an 802.11ah communication system is operated in the travelling pilot mode, where the pilot sub-carrier index changes with time as specified in Section 23.3.9.10 of the 802.11ah standard. The performance impact of LoRa interference is expected to be lower than the cases of fixed pilots with LoRa overlapping on a pilot sub-carrier. For travelling pilots, the performance improvement obtained by an embodiment of the interference detection and mitigation algorithm for 4 MHz MCS 0 settings is shown in FIG. 6. The thick line in FIG. 6 represents the result of a system implementing the embodiment of the interference detection and mitigation algorithm whereas the thin line represents the result of a conventional system without implementing the interference detection and mitigation algorithm. With travelling pilots, the performance improvement achieved is close to 6 dB for the 4 MHz MCS 0 setting. The PER performance after applying the interference detection and mitigation algorithm should be similar for fixed and travelling pilots.

The objective of the proposed narrowband interference detection and mitigation system and corresponding algorithm is to mitigate rate degradations observed in the presence of narrowband interference. Some embodiments of the interference detection and mitigation algorithm detect and null out the channel estimates of sub-carriers overlapped with interference only after the packet is detected. The performance improvement achieved by the interference detection and mitigation algorithm is expected to be limited by the performance of packet detection. Some simulations are conducted to check whether the performance gains are restricted by the performance of packet detect. The rate of packet detect misfiring in the presence of LoRa interference for transmitting on 2 MHz or 4 MHz channel is compared against the PER curves for MCS 0 setting, which has the lowest PER. The PER curve for the LoRa interference overlaps only with the data sub-carriers is used as an estimate for the performance improvement achieved by the embodiment of the interference detection and mitigation algorithm. Packet detection starts to fail to fire after the SIR decreases below 5 dB for both 2 MHz and 4 MHz cases. Currently, there is about 5 to 6 dB performance gap between the curve of packet detect fail to fire and the PER results obtained using the embodiment of the interference detection and mitigation algorithm.

In some embodiments, the Wi-Fi signal is modified in a manner such a relevance of the designated sub-carriers is reduced by a time-domain approach of interference mitigation. Embodiments of the time domain approach [KC5] for narrowband interference mitigation use one or more notch filters to reduce the output power associated with the frequency affected by narrowband interference. For example, a first order Infinite Impulse Response (IIR) notch filter with a pole-zero configuration whose transfer function is given by:

$$H(z) = \frac{1 - z_0 z^{-1}}{1 - p_0 z^{-1}}$$

In an embodiment, the notch filters are adaptive notch filters having zeros corresponding to the interference locations detected by the narrowband interference detection algorithm. For example, the zeros of the first order IIR notch filters correspond to the sub-carrier frequencies associated with the maximum values of the power related values indicated by the sub-carrier indices (max_psd_index) output from the narrowband interference detection algorithm.

Figure 7A:
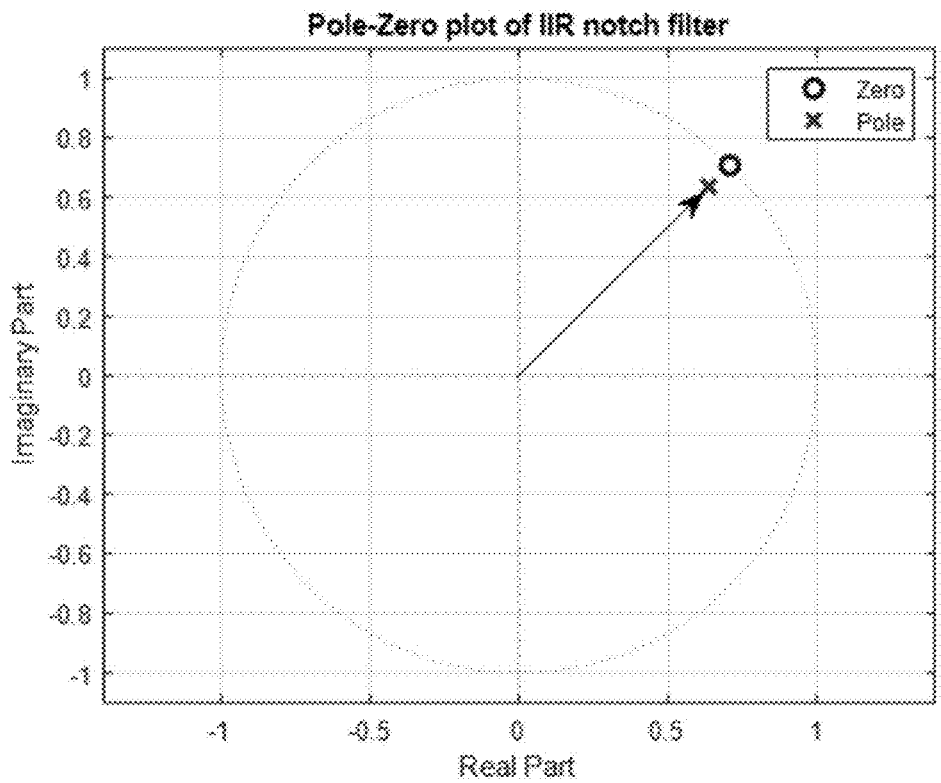
FIG. 7A illustrates a pole-zero plot of an exemplary notch filter.
Figure 7B:
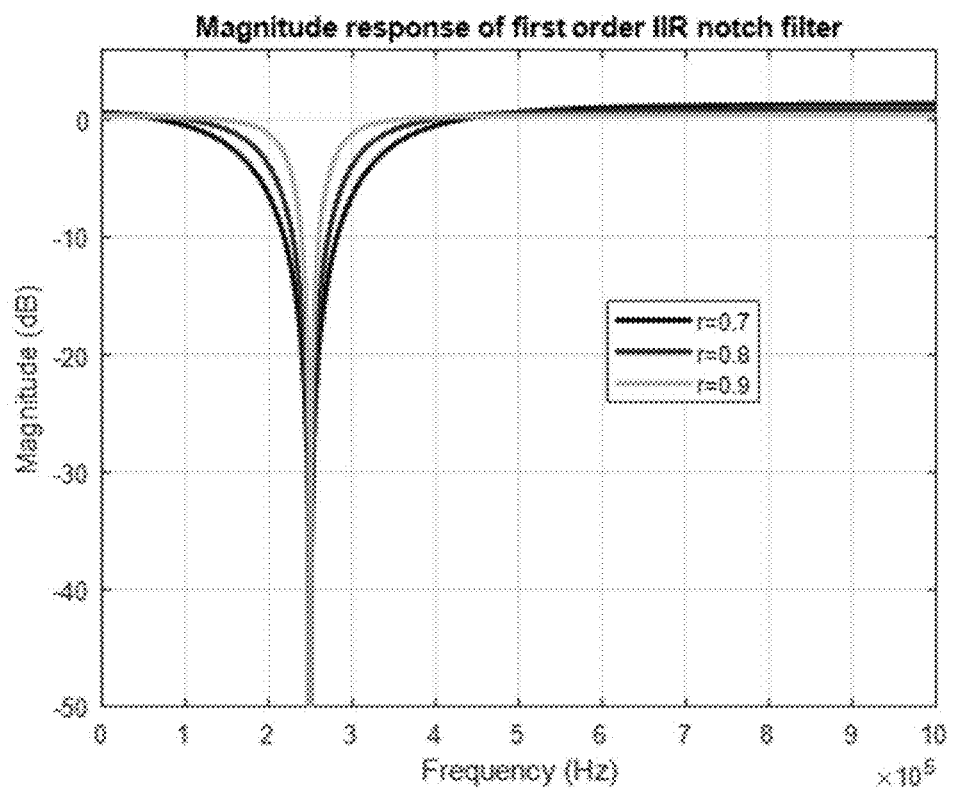
FIG. 7B illustrates the frequency characteristic of an exemplary notch filter that can be used to reduce the effect of narrowband interference according to an embodiment of the present invention.

FIG. 7A and FIG. 7B show the frequency characteristics of the notch filter used for interference mitigation according to an embodiment. The zero is located on a unit circle at an angular frequency $\omega_N$, and the value of the zero is:

$$z_0 = e^{j\omega_N} = \cos(w_N) + j \sin(\omega_N)$$

The pole is located at the same angular frequency, but inside the unit circle to ensure stability of the notch filter. The value of the pole is derived by the following formula, where r is a contraction factor.

$$p_0 = r e^{j\omega_N}$$

Typically, r is chosen to be close to unity, and the value of r also determines the bandwidth of the notch filter. The differential education relating the input x[n] and the output y[n] is given by:

$$y[n] = x[n] - z_0 x[n-1] + p_0 y[n-1]$$
$$= x[n] - e^{j\omega_N} x[n-1] + re^{j\omega_N} y[n-1]$$

To remove interference, the interference frequency needs to be estimated to place the notch filter(s) at the desired location(s). In cases when the frequency of the notch filter corresponding to the zero matches with the frequency of the tone, the notch filter output power will be a minimum. This objective can be used to adaptively track the zero of the notch filter so that it converges to the frequency corresponding to the interference frequency. A cost function J minimizes the output power of the notch filter $|y[n]|^2$. The Least Mean Square (LMS) update for the angular frequency $\omega_N$ is given by:

$$\omega_N[n+1] = \omega_N[n] - \mu \nabla_{\omega_N} J$$
$$= \omega_N[n+1] - \mu \nabla_{\omega_N} |y[n]|^2$$

where $\Delta\omega_N$ represents the complex gradient operator with respect to the angular frequency $\omega_N$.

$$\nabla_{\omega_N} |y[n]|^2 = \frac{\partial |y[n]|^2}{\partial \omega_N}$$
$$= y[n] \frac{\partial y^*[n]}{\partial \omega_N} + y^*[n] \frac{\partial y[n]}{\partial \omega_N}$$

-continued
$$= j\{e^{-j\omega_N} y[n]x^*[n-1] - e^{j\omega_N} y^*[n]x[n-1]\} +$$
$$jr\{e^{j\omega_N} y^*[n]y[n-1] - e^{-j\omega_N} y[n]y^*[n-1]\}$$
$$= 2\text{Im}\{e^{-j\omega_N} y[n]x^*[n-1] + re^{j\omega_N} y^*[n]y[n-1]\}$$

The LMS update for the angular frequency $\omega_N$ is given by:

$$\omega_N[n+1] = \omega_N[n] + \mu \text{Im}\{e^{-j\omega_M[n]} y[n]x^*[n-1] + re^{j\omega_N[n]} y^*[n]y[n-1]\}$$

By representing $z_0[n] = e^{j\omega_N[n]}$, the above equation can be rewriting as:

$$\omega_N[n+1] = \omega_N[n] + \mu \text{Im}\{z_0^*[n]y[n]x^*[n-1] + rz_0[n]y^*[n]y[n-1]\}$$

In the simulation of implementing a notch filter for time domain interference mitigation, LoRa interference is considered as the only narrowband interference and assuming there is no presence of any 802.11ah signal. LoRa essentially employs a chirp spread spectrum modulation technique that uses a linear frequency modulated chirp pulses to encode information. For such a signal, the instantaneous frequency changes linearly with time. The adaptive notch filter employing the above LMS update algorithm can precisely track the frequency of a LoRa only signal with noise whose power is 20 dB below the power of the LoRa signal. The LoRa signal has a bandwidth of 125 kHz and is at an offset of 0.25 MHz from DC. The adaptive notch filter only takes about 100 samples to reach a steady state and lock to the interference signal. In another simulation of implementing notch filters for time domain interference mitigation, both desired 802.11ah signal and LoRa interference are considered.

Figure 8:
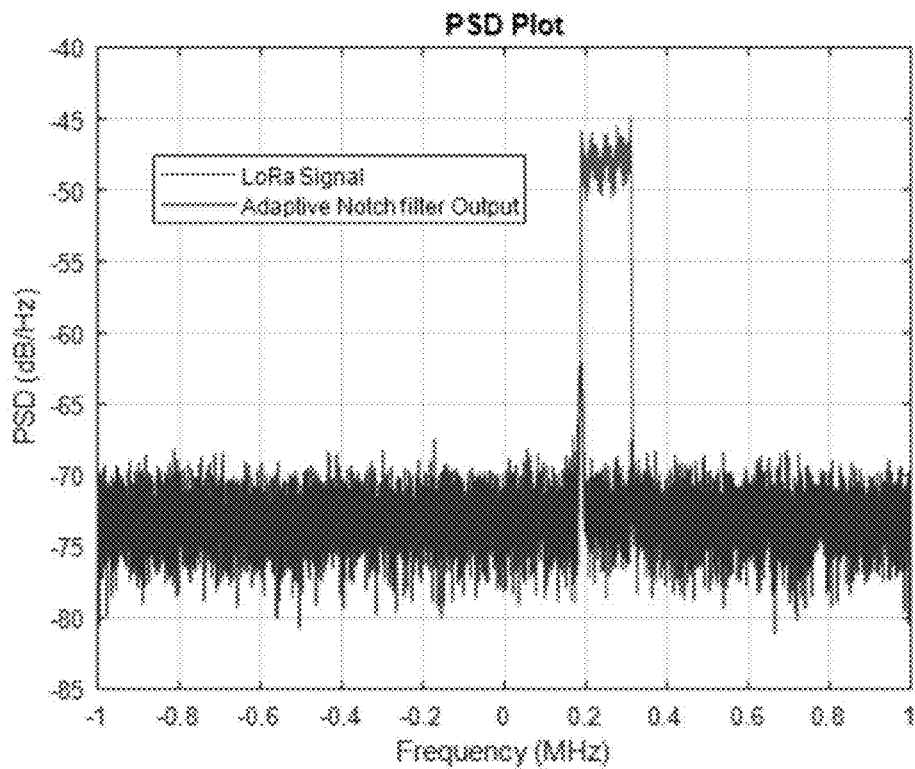
FIG. 8 shows the PSD of the LoRa signal and output of an adaptive notch filter used to mitigate a LoRa interference according to an embodiment of the present invention.
Figure 9:
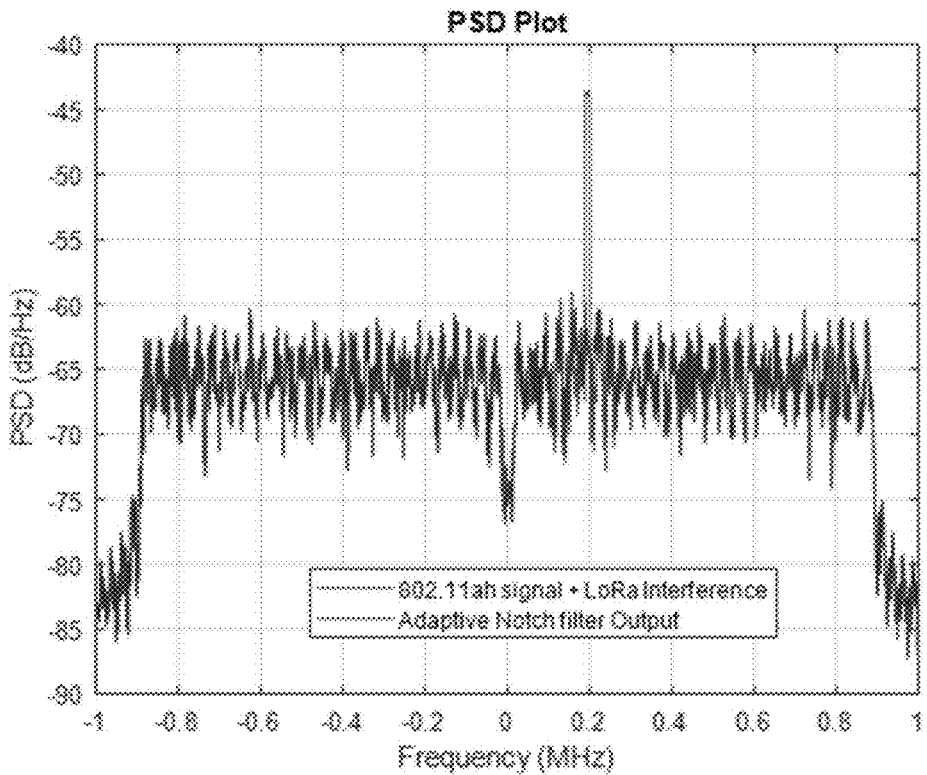
FIG. 9 shows the PSD of an 802.11ah packet interfered by a LoRa signal with SIR of 0 dB and an embodiment of the adaptive notch filter effectively suppresses narrowband interference.
Figure 10:
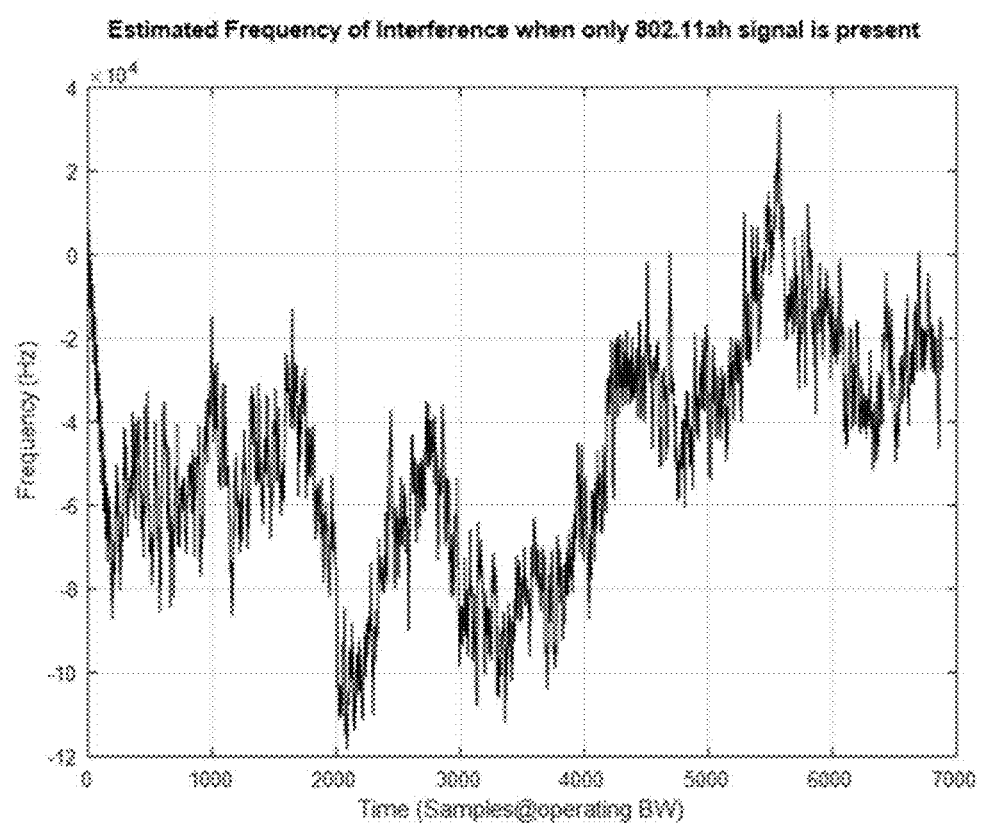
FIG. 10 shows the estimated narrowband interference frequency without the presence of an interference signal.

FIG. 8 shows the PSD of the LoRa signal and the output of the adaptive notch filter across the operating frequency band when LoRa interference is the only narrowband interference. From the plot of FIG. 8, the adaptive notch filter is effective in suppressing the narrowband interference caused by the LoRa signal in this simulation. FIG. 9 shows the PSD of an 802.11ah packet interfered with a LoRa signal and the output of the adaptive notch filter when both the desired 802.11 signal and LoRa interference are present. Once again, the adaptive notch filter in this simulation has been effectively suppressing the narrowband interference from LoRa. FIG. 10 shows the estimated frequency of the narrowband interference when there is no interference, but only the 802.11ah signal present on the operating frequency band. The mean frequency estimate is close to 0 Hz.

Figure 11A:
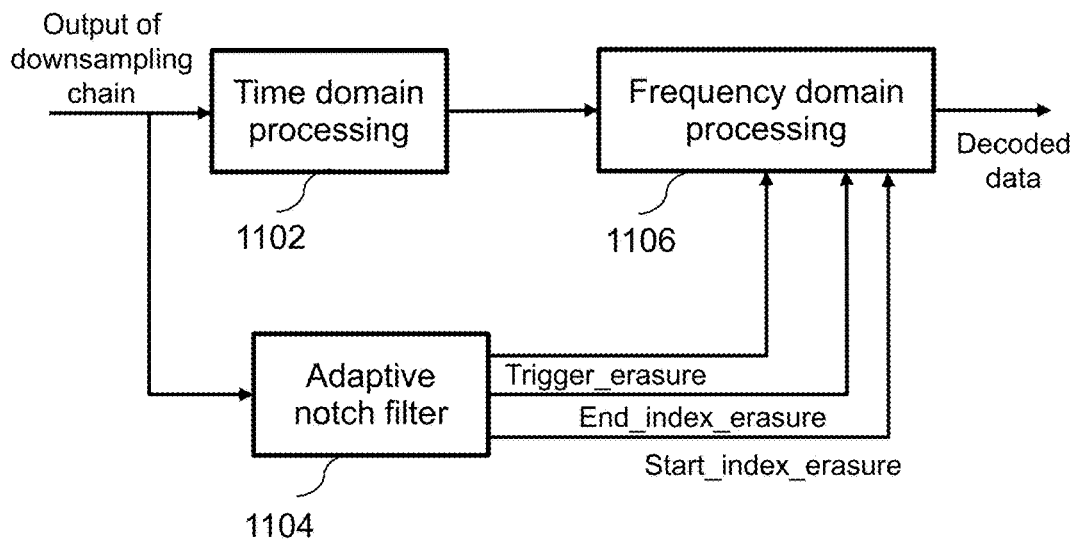
FIG. 11A is a block diagram illustrating a receiver chain with an adaptive notch filter for reducing narrowband interference in accordance with an embodiment of the present invention.

FIG. 11A is a block diagram illustrating [KC6] a receiver chain implementing narrowband interference detection and mitigation in accordance with an embodiment of the present invention. An output signal of a down-sampling chain is processed by a time domain processing module 1102. An adaptive notch filter 1104 provides information on the frequency at which the narrowband interference is located to a frequency domain processing module 1106. This information can be used to null out or suppress sub-carriers around narrowband interference in the frequency domain. The adaptive notch filter 1104 provides a trigger, a start sub-carrier index, and an end sub-carrier index to the frequency domain processing module 1106. The frequency domain processing module 1106 nulls out the sub-carriers associated with the sub-carriers with indices in between the start sub-carrier index and the end sub-carrier index according to this embodiment. Nulling out of sub-carriers is performed by zeroing out the channel estimates on the affected sub-carriers. The advantage of doing this is twofold; firstly, the nulling out operation helps to de-weight affected sub-carriers so that it does not contribute to the Customer Premises Equipment (CPE) estimate in cases when the interference falls over a pilot sub-carrier; secondly, the soft outputs on the affected sub-carriers turn out to be low confidence values hence equivalent to declaring these sub-carriers as erasures. This helps the Viterbi decoder make more accurate decisions. The frequency domain processing module 1106 outputs decoded data.

Figure 11B:
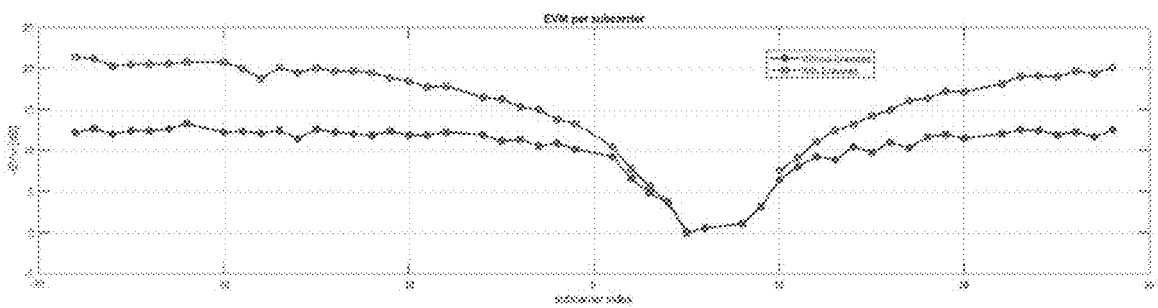
FIG. 11B shows the EVM across sub-carriers with and without implementing an embodiment of the interference detection and mitigation algorithm for the case of an 802.11ah signal interfered by a LoRa signal.

FIG. 11B shows an Error Vector Magnitude (EVM) across sub-carriers with and without implementing an embodiment of the interference detection and mitigation algorithm for the case of an 802.11ah signal interfered by a LoRa signal. In this example, the SIR is 0 dB and the LoRa interference is at an offset of 0.25 MHz from DC. The LoRa interference in this example affects a pilot sub-carrier with a sub-carrier index equal to 7.

Figure 11C:
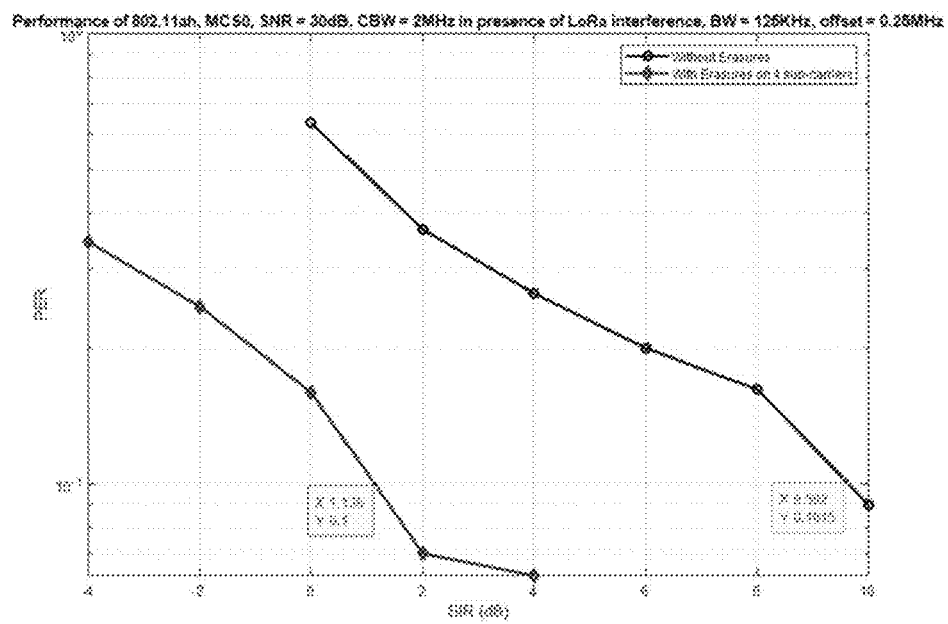
FIG. 11C illustrates a comparison of the PER performance of receiving an 802.11ah signal coded by MCS 0 without and with implementing an embodiment of the interference detection and mitigation algorithm in the presence of LoRa interference.

FIG. 11C shows a comparison of the performance of an 802.11ah signal transmitted in MCS 0 without and with implementing an embodiment of the interference detection and mitigation algorithm in the presence of LoRa interference, where the SNR is 30 dB and the channel bandwidth is 2 MHz. The LoRa signal has a bandwidth of 125 kHz and is at an offset of 0.25 MHz. As shown in FIG. 11C, an improvement of around 8 dB is achieved with implementing the interference detection and mitigation algorithm.

Figure 12:
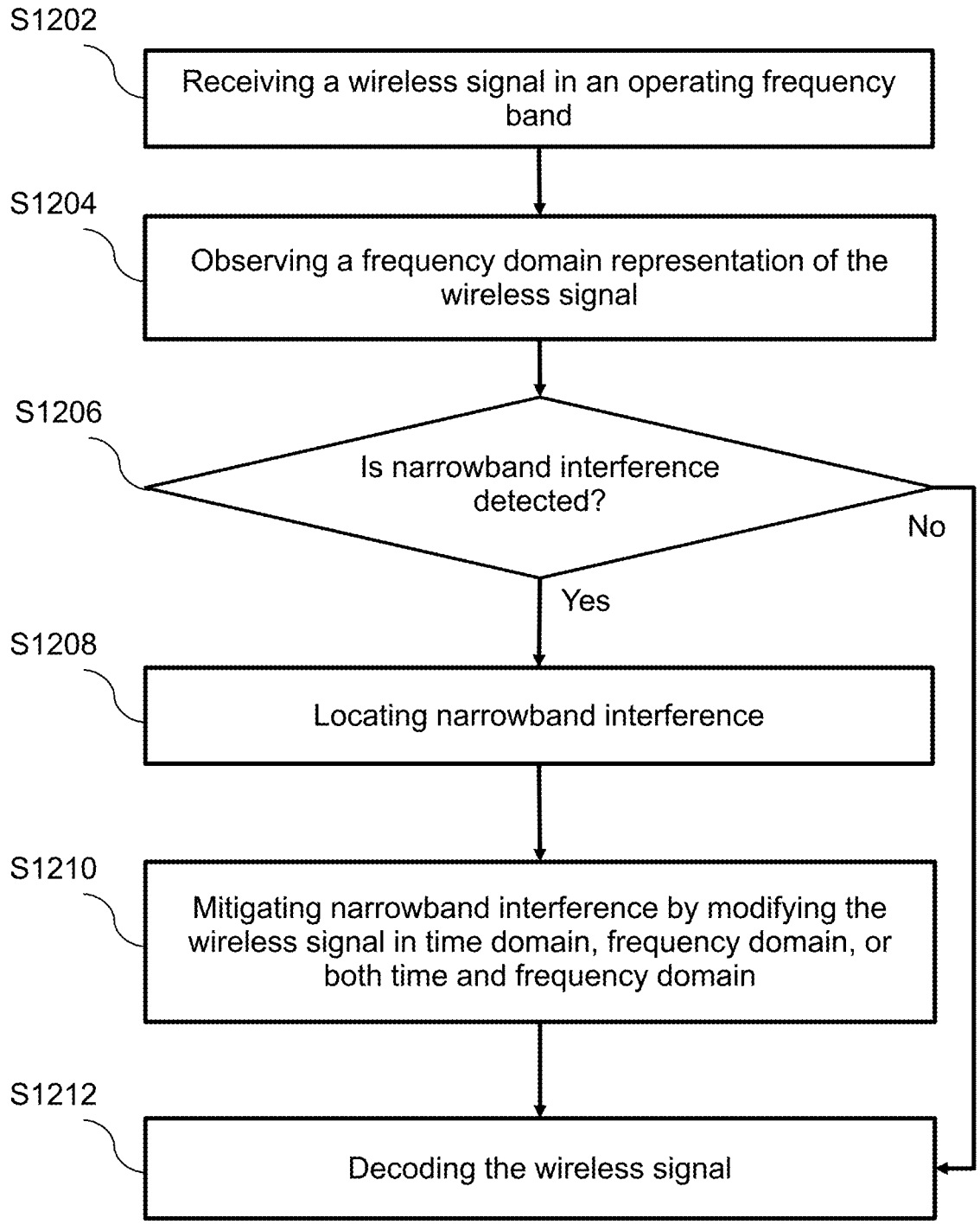
FIG. 12 is a flowchart illustrating an embodiment of the narrowband interference detection and mitigation method for improving the performance of receiving a wireless signal interfered by narrowband interference.

FIG. 12 is a flowchart demonstrating steps of the interference detection and mitigation method according to embodiments of the present invention. A wireless communication device receives a wireless signal in an operating frequency band in step S1202. For example, the wireless communication device is capable of receiving and decoding data packets complying the 802.11ah standard. In step S1204, the wireless communication device observes a frequency domain representation of the wireless signal to detect any narrowband interference in the operating frequency band. In an embodiment, the frequency domain representation is an output from an FFT which converts the wireless signal from the time domain to a representation in the frequency domain. From the observation results of step S1204, the wireless communication device detects whether there is narrowband interference in the operating frequency band in step S1206. In some embodiments of the present invention, the wireless communication device only observes and detects narrowband interference during an idle period or a silence period. There is no data packet present in the operating frequency band on a wireless communication medium during the idle period. An embodiment of observing the frequency domain representation of the wireless signal and detecting narrowband interference includes measuring power related values associated with one or more sub-carrier frequencies, identifying a maximum power related value, calculating a threshold power value based on the maximum power related value and a scale factor, counting a number of sub-carriers associated with power related values below the threshold power value, and determining whether narrowband interference is present depending on the counted number of sub-carriers. In cases when the wireless communication device detects the presence of narrowband interference in step S1206, the wireless communication device locates narrowband interference within the operating frequency band in step S1208, then mitigates narrowband interference by modifying the wireless signal in a time domain, frequency domain, or both the time and frequency domains in step S1210 according to various embodiments. In some embodiments of performing narrowband interference mitigation in the time domain, the wireless signal is modified by one or more notch filters. For example, the wireless communication device sets zero of each notch filter according to a narrowband interference location detected in step S1208 to reduce narrowband interference in the time domain. In some embodiments of performing narrowband interference mitigation in the frequency domain, the wireless signal is modified by reducing the relevant of one or more designated sub-carriers. For example, the wireless communication device suppresses or nulls out the designated sub-carriers in the frequency domain to remove narrowband interference. The designated sub-carriers are derived from the narrowband interference location(s) derived in step S1208, that correspond to the sub-carriers affected by narrowband interference. Some embodiments of the designated sub-carriers include a predefined number of sub-carriers including the sub-carrier corresponding to the maximum power related value and its adjacent sub-carriers, for example, the designated sub-carriers are three sub-carriers including the sub-carrier having the maximum power related value and its two adjacent sub-carriers. In some other embodiments, the number of designated sub-carriers is adaptively determined. For example, more sub-carriers are designated to be affected by narrowband interference when there are more sub-carriers with high power related values. In some embodiments, the wireless communication device modifies the wireless signal in both the time and frequency domains to mitigate narrowband interference. In step S1212, the wireless communication device decodes the wireless signal.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

Throughout this specification, unless the context clearly requires otherwise, the word "comprise", or variations such as "comprises" or "comprising", will be understood to imply the inclusion of a stated element, integer or step, or group of elements, integers, or steps, but not the exclusion of any other element, integer or step, or group of elements, integers, or steps.

The term "device" or "module" is not limited to one or a specific number of physical objects (such as one smartphone, one controller, one processing system and so on). As used herein, a device may be any electronic device with one or more parts that may implement at least some portions of the invention in this disclosure. While the description and examples use the term "device" or "module" to describe various aspects of this disclosure, the term "device" or "module" is not limited to a specific configuration, type, or number of objects. Additionally, the term "system" or "module" is not limited to multiple components or specific aspects. For example, a system may be implemented on one or more printed circuit boards or other substrates and may have movable or static components. While the description and examples use the term "system" to describe various aspects of the invention in this disclosure, the term "system" is not limited to a specific configuration, type, or number of objects.

Specific details are provided in the description above to provide a thorough understanding of the aspects and examples provided herein. However, it will be understood by one of ordinary skills in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

What is claimed is:

1. A method of narrowband interference detection and mitigation during reception of wireless signals, the method comprising:
   receiving a wireless signal in an operating frequency band on a wireless communication medium by a wireless communication device;
   observing a frequency domain representation of the wireless signal and measuring a plurality of power related values of the frequency domain representation;
   identifying a maximum power value of the power related values and a sub-carrier associated with the maximum power value;
   calculating a threshold power value based on the maximum power value and a scale factor;
   counting a number of sub-carriers having power related values below the threshold power value;
   determining whether narrowband interference is present based on the counted number of sub-carriers; and
   in response to the presence of narrowband interference in the operating frequency band, determining one or more sub-carriers affected by narrowband interference and modifying the wireless signal based on the determined sub-carriers affected by narrowband interference.

2. The method of claim 1, wherein observing and measuring the power related values of the frequency domain representation for narrowband interference detection is only performed during an idle period when no data packet is present in the operating frequency band on the wireless communication medium.

3. The method of claim 2, wherein the idle period includes a Distributed coordination function Inter-Frame Space (DIFS) period.

4. The method of claim 1, wherein observing and measuring the power related values of the frequency domain representation for narrowband interference detection is performed during detection of data packets, and a Long Training Field (LTF) of the data packets is used for narrowband interference detection.

5. The method of claim 1, further comprising converting the wireless signal to the frequency domain representation using a Fast Fourier Transform (FFT), wherein the power related values correspond to magnitudes of FFT outputs.

6. The method of claim 1, wherein the sub-carriers determined to be affected by narrowband interference include the sub-carrier associated with the maximum power value and one or more adjacent sub-carriers, and the sub-carriers determined to be affected by narrowband interference are declared as erasures for time domain processing, frequency domain processing, or both time and frequency domain processing.

7. The method of claim 6, wherein a number of the sub-carriers determined to be affected by narrowband interference is predefined or adaptively determined.

8. The method of claim 1, wherein the step of determining whether narrowband interference is present comprises comparing the counted number of sub-carriers with a threshold count value, and determining narrowband interference is present when the counted number of sub-carriers is larger than the threshold count.

9. The method of claim 1, wherein the step of determining whether narrowband interference is present comprises determining a percentage of counted number of sub-carriers to a total number of sub-carriers, and determining narrowband interference is present when the percentage is higher than a predefined percentage.

10. The method of claim 1, wherein the step of modifying the wireless signal comprises modifying the power related values of the sub-carriers determined to be affected by narrowband interference in a frequency domain.

11. The method of claim 10, wherein modifying the power related values in the frequency domain comprises communicating sub-carrier indices of the sub-carriers determined to be affected by narrowband interference to a frequency demodulation processor.

12. The method of claim 10, wherein modifying the power related values in the frequency domain comprises zeroing, nulling out, or suppressing the power related values of the sub-carriers determined to be affected by narrowband interference.

13. The method of claim 1, wherein the step of modifying the wireless signal comprises processing the wireless signal to suppress one or more frequencies associated with the sub-carriers determined to be affected by narrowband interference in a time domain.

14. The method of claim 13, wherein processing the wireless signal in the time domain comprises filtering the wireless signal using one or more notch filters, wherein a zero of each notch filter is set to a frequency corresponding to one or more sub-carrier determined to be affected by narrowband interference.

15. The method of claim 14, wherein the one or more notch filters are cascaded first order Infinite Impulse Response (IIR) notch filters.

16. The method of claim 13, wherein the step of modifying the wireless signal further comprises processing the wireless signal in a frequency domain to further mitigate narrowband interference after processing the wireless signal in the time domain.

17. A method of narrowband interference detection and mitigation during reception of wireless signals, the method comprising:
receiving, by a wireless communication device, time domain baseband samples corresponding to a wireless signal in an operating frequency band on a wireless communication medium;
observing a frequency domain representation of the wireless signal to detect any sub-carrier affected by narrowband interference;
generating one or more narrowband interference locations and identifying one or more sub-carrier indices when narrowband interference is present in the operating frequency band;
generating a processed time domain signal by processing the time domain baseband samples to suppress one or more frequencies associated with the one or more narrowband interference locations, the processing comprising time domain processing configured according to frequency domain information indicative of the one or more narrowband interference locations; and
providing the processed time domain signal as input to a frequency domain processing module configured to modify power related values associated with one or more sub-carriers of the operating frequency band, the one or more sub-carriers corresponding to the one or more sub-carrier indices, and wherein the power related values are modified in a frequency domain.

18. The wireless communication device of claim 17, wherein the step of observing a frequency domain representation comprises measuring a plurality of power related values of the frequency domain representation, identifying a maximum power value and a sub-carrier associated with the maximum power value; calculating a threshold power value based on the maximum power value and a scale factor, counting a number of sub-carriers having power related values below the threshold power value, and determining a presence of narrowband interference based on the counted number of sub-carriers.

19. The wireless communication device of claim 17, wherein the step of observing a frequency domain representation comprises only detecting narrowband interference during an idle period when no data packet is present in the operating frequency band.

20. A wireless communication device configured for narrowband interference detection and mitigation, comprising:
an interference detection module, wherein the interference detection module is configured to: observe a frequency domain representation of a wireless signal to detect any sub-carrier affected by narrowband interference, and generate one or more narrowband interference locations and identify one or more sub-carrier indices when narrowband interference is present in an operating frequency band;
a time domain processing module, coupled to the interference detection module to thereby receive the one or more narrowband interference locations, and wherein the time domain processing module is configured to: generate a processed time domain signal by processing time domain baseband samples corresponding to the wireless signal to suppress one or more frequencies associated with the one or more narrowband interference locations,
wherein the time domain processing module is configured according to frequency domain information of the one or more narrowband interference locations; and a frequency domain processing module, coupled to the interference detection module to thereby receive the one or more sub-carrier indices, and coupled to the time domain processing module to thereby receive the processed time domain signal, wherein the frequency domain processing module is configured to:
modify power related values associated with one or more sub-carriers of the operating frequency band, the one or more sub-carriers corresponding to the one or more sub-carrier indices,
wherein the power related values are modified in a frequency domain.

21. The wireless communication device of claim 20, wherein the time domain processing module comprises one or more time domain notch filters configured to operate on inputs comprising the time domain baseband samples, and wherein a zero parameter of each respective time domain notch filter of the one or more time domain notch filters is set according to the frequency domain information for a respective one of the narrowband interference locations.

* * * * *